United States Patent [19]

Land, Jr. et al.

[11] 4,204,311
[45] May 27, 1980

[54] METHOD AND DEVICE FOR INSERTING A RIGID LINER IN A HELMET SHELL

[76] Inventors: Elvert H. Land, Jr., 16205 E. Pawnee, Wichita, Kans. 67230; Joseph E. Land, 2303 White Oak, Wichita, Kans. 67207

[21] Appl. No.: 960,222

[22] Filed: Nov. 13, 1978

[51] Int. Cl.² .............................................. B23P 11/02
[52] U.S. Cl. ........................................ 29/451; 29/235
[58] Field of Search ................................. 29/235, 451

[56] References Cited

U.S. PATENT DOCUMENTS

| | | | |
|---|---|---|---|
| 865,498 | 9/1907 | Kenyon | 29/235 |
| 2,865,090 | 12/1958 | Cohn | 29/235 X |
| 2,948,226 | 8/1960 | Smirl | 29/235 X |
| 3,097,030 | 7/1963 | Hartley | 29/453 X |
| 3,182,387 | 5/1965 | Sundberg | 29/235 X |
| 3,214,811 | 11/1965 | Adinalfi | 29/453 UX |
| 3,789,496 | 2/1974 | Barabas | 29/453 |
| 3,863,326 | 2/1975 | Haberle | 29/453 X |
| 4,127,431 | 11/1978 | Susnjara | 29/235 X |

*Primary Examiner*—Charlie T. Moon
*Attorney, Agent, or Firm*—Edward L. Brown, Jr.

[57] ABSTRACT

The device facilitates inserting a rigid liner in a helmet shell which has an opening narrower than the liner and prevents damaging scratches on the shells interior finish. The device has a bowl-shaped based to hold the helmet shell in an inverted position beneath a hinged frame from which hangs one or more slip sheets. The slip sheets are made of smooth, flexible material which hangs from the frame to form a partial, temporary lining of the helmet. The rigid liner is shoved down into position within the helmet shell while the slip sheets act similarly to a shoehorn permitting the liner to slip into place without damaging the inside surface of the shell. The frame, including the assembled helmet, is then raised to an upper position and latched. The assembled helmet is then pulled forward freeing it from the slip sheets which remain attached to the frame ready to use in the next assembly.

6 Claims, 4 Drawing Figures

METHOD AND DEVICE FOR INSERTING A RIGID LINER IN A HELMET SHELL

BACKGROUND OF THE INVENTION

The field of the invention is protective helmets, for motorcyclists and others, to guard the wearer against head injuries. More particularly, the field is that of helmet assembly, of inserting rigid liners into helmet shells made of fiberglass or a transparent plastic which are color coated on their inside surface. The rigid liner used in such a shell is a thick, stiff material usually molded from expanded polystyrene.

At present, liners are forced into the shell by hand and then adjusted or centered to the proper position, also by hand. This method of insertion and adjustment requires a substantial amount of physical force and sometimes causes scratches of the coating on the inside of the shell due to the tight fit and abrasive qualities of the contacting surfaces. Some helmet shells are made of hand-laid fiberglass which is very abrasive. Other shells are painted with a metal flake paint on the inside surface which is also very abrasive. Such damage is avoided by this invention, and in addition, the time required for insertion and centering of the liner is substantially reduced.

SUMMARY OF THE INVENTION

The inserting device comprises a base having a bowl-shaped hollowed-out recess shaped to support an inverted helmet shell. An upright rises from the rear of the base and supports a frame which is movable up and down. When the frame is in its lower position and a helmet shell is positioned thereunder, the frame extends alongside of and just above at least the two sides of the helmet shell and preferably also around the front and back. Slip sheets, made of a smooth and flexible material are fastened to the frame along the sides of the helmet shell and hang downward into the shell. The verb "to shroud", as used in the claims and specification, means to cover for protection. The slip sheets are of a size to shroud and protect the colored coating or finish on the inside of the shell during the insertion of a close-fitting relatively thick and rigid liner and the centering of it to its proper location. The slip sheets also serve to ease the insertion and centering. The slip sheets are then withdrawn from the assembled helmet by raising the frame while holding down the assembly. One embodiment has, in addition, a latch fastened to the upright which latches to the frame when it is in its upper position so that both hands may be used to pull the assembled helmet from the slip sheets which remain attached to the frame. When desirable, an additional slip sheet can be located on the frame to shroud the inside of the back of the shell and still another slip sheet can be similarly added to shroud the inside of the front providing protection to all of the interior colored finish and further easing the insertion and centering. The lower part of the sides of the helmet shell, known as the cheeks, have a thin lining adhered inside.

An object of this invention is to prevent damage to the colored coating on the interior of a helmet shell while inserting a close-fitting rigid liner.

Another object of the invention is to ease the insertion of a close-fitting rigid liner into a helmet shell.

BRIEF DESCRIPTION OF THE DRAWINGS

These and other objects and advantages of the invention are set forth or will become apparent from the following detailed description of preferred forms of the invention when read in conjunction with the accompanying drawings wherein.

DESCRIPTION OF THE PREFERRED EMBODIMENTS

Figure 4:
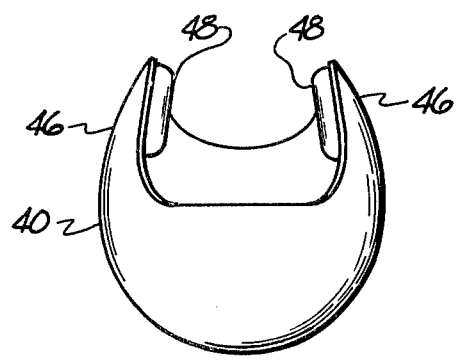
FIG. 4 is a front elevational view of a helmet shell in an inverted position showing the narrow entrance for a close-fitting rigid liner.

A device generally referred to by reference numeral 10, is shown for inserting a close-fitting rigid liner 42 into a helmet shell 40. The device 10 prevents any damage to the colored coating 38 on the inside surface of the helmet shell 40 while the liner 42 is being inserted and centered in its proper location. The shell 40 is formed of a transparent strong plastic, such as a polycarbonate, with the color coating 38 on the inside thereof, which is a well-known method of making various colorful helmets that are resistant to scratch damage on their exterior. The coating 38 is quite often a metal flaked paint and is protected on the inside by a pair of thin cheek linings 50 located on the cheeks 46. The liner 42 is usually formed from expanded polystyrene and is quit rigid but compressible to provide protection to the skull. The liner is lined with a soft inner lining 44. The rigidity of the liner 42 and the shape of the helmet shell 40, as can be seen in FIG. 4, along with the abrasive surface of metal flake paint make the insertion of the liner 42 difficult. The liner 42 is as wide as the widest part of the skull, plus the thickness of the liner on each side while the cheeks 46 of the helmet shell 40 converge to a level just under the chin, making a restricted entrance for the liner 42. A pair of ear cushions 48, seen in FIG. 4, are soft and do not offer resistance to insertion of the liner. However, without this invention, the insertion and centering is difficult and damage to the colored coating 38 often results.

Figure 1:
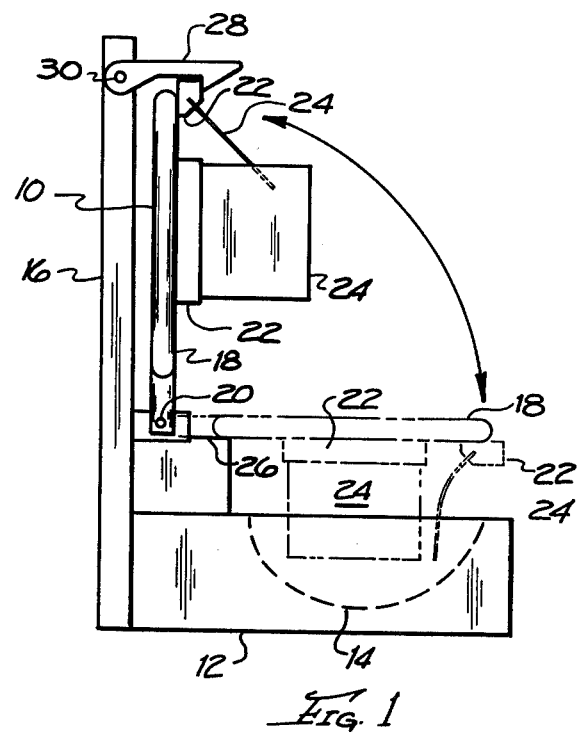
FIG. 1 is a side elevational view of the device showing a pivotally mounted frame in its upper and lower position.
Figure 2:
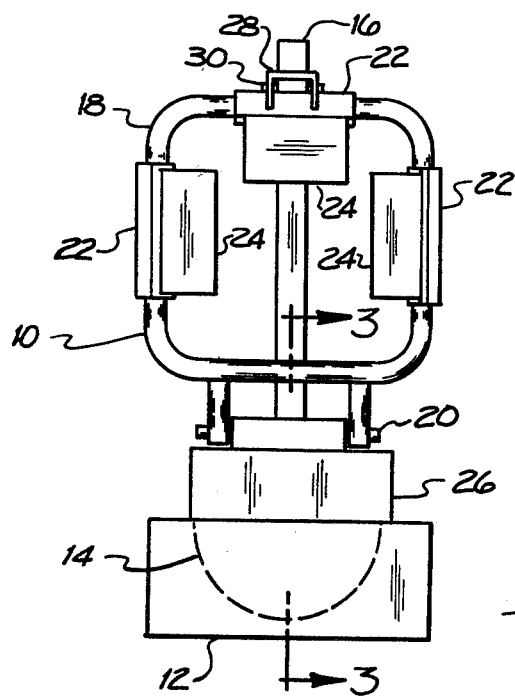
FIG. 2 is a front elevational view of the device shown in FIG. 1 with the frame shown in its upper position.
Figure 3:
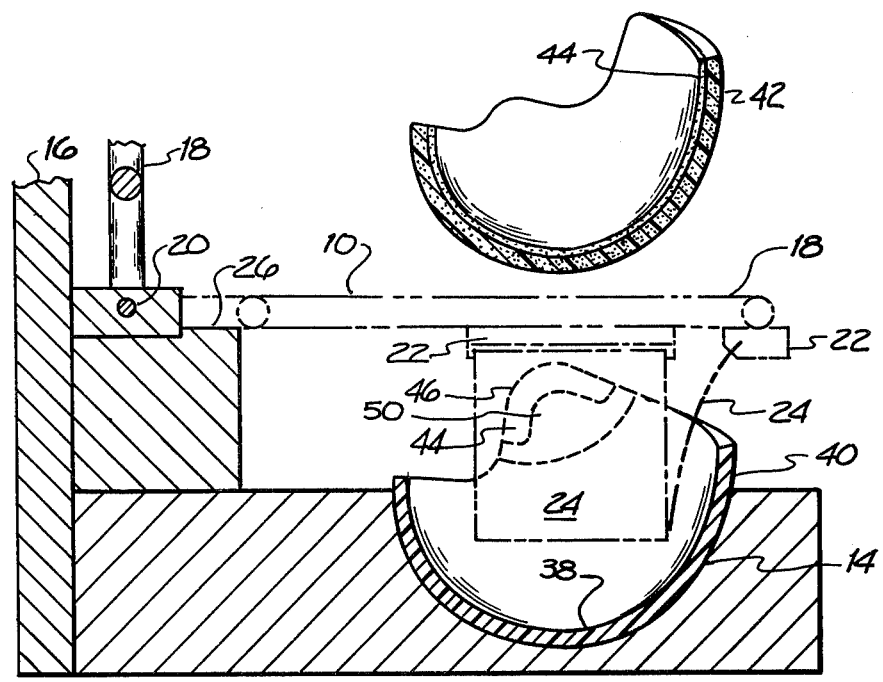
FIG. 3 is a partial longitudinal sectional view taken on the line 3—3 of FIG. 2, but showing the frame in its lower position and showing workpieces in position for assembly.

To avoid this damage, the device 10 has a base 12 having a bowl-shaped recess 14 shaped to accept and support the inverted helmet shell 40. An upright 16 arises from the back of the base 12 and supports a frame 18, which in the preferred embodiment shown in FIGS. 1, 2 and 3, is pivotally attached to the upright 16 with a frame pivot 20 and pivots to an upper or lower position, as shown in FIG. 1. A stop 26 supports the frame 18 in its lower position just above the helmet shell 40, as shown in FIG. 3. The frame 18 in the preferred embodiment is made of lightweight metal tubing and, as seen in FIG. 2, is formed in the shape of a rectangle with rounded corners having extensions to the frame pivot 20. The frame 18 can also be constructed to remain horizontal and slide up and down on the upright 16, or the frame 18 can be supported simply on legs, if desired, but the pivot 20 type of support has been found the most useful.

The frame 18 holds at least a pair of slip sheets 24, each of which is fastened to the frame 18 by a fastening means 22. The slip sheets 24 hang from the frame 18, as can be seen in FIG. 3, so that they shroud the interior side walls of the helmet shell 40. In this position, the slip sheets 24 cover the cheeks 46, the ear cushions 48, the cheek linings 50, and a portion of the colored coating 38. The slip sheets 24 are a thin, smooth, flexible material having a low coefficient of friction with the rigid liner 42. In the preferred embodiment, the slip sheets 24 are a polytetrafluoroethylene resin, such as Teflon, although other smooth, flexible, low-friction materials can also be used. While this device 10 will serve its purpose with just the pair of slip sheets 24, the preferred embodiment has a third slip sheet 24, with its fastening means 22 positioned on the frame 18 to shroud the interior rear wall of the helmet shell 40. For the assembly of certain other types of helmets, a fourth slip sheet 24, with its fastenings means 22, positioned on the frame 18 to shroud the interior front wall of the helmet shell 40, is desirable to give more complete shrouding. The slip sheets 24 also facilitate the insertion and centering operation by the shoehorn-like effect which eases the insertion of the liner 42 between the convergent cheeks 46 of the helmet shell 40. The cheeks 46 have to be spread apart to permit passage of the liner 42 and the low coefficient of friction of the slip sheets helps the insertion.

Another step remains, that of removing the slip sheets 24 from the assembled helmet so that the rigid liner 42 is in contact with the colored coating 38. The high coefficient of friction between these surfaces keeps the liner 42 centered, meaning in its proper position. The assembled helmet can be held down with one hand while the other hand is used to raise the frame 18 which withdraws the slip sheets 24. Another way to do this and which is part of the preferred embodiment is, as can be seen in FIG. 1, to provide a latch 28 attached to the upright 16 with a latch pivot 30. The latch 28 engages the frame 18 when it is raised to its upper position and holds it there until released. Both hands can then grasp the edges of the helmet shell 40 and pull it toward the operator, releasing the assembled helmet from the slip sheets 24. Another helmet shell is then placed in the recess 14, the frame 18 is released from the latch 28 and the frame 18 lowered to its lower position ready to facilitate insertion of the next liner 42.

Having described the invention and the method of its operation with sufficient clarity to enable those familiar with the art to construct and use it, we claim:

1. A device for inserting a rigid liner in a helmet shell comprising:
    a base having a bowl-shaped recess that supports the helmet shell in an inverted position;
    an upright rising from and fixed to the base;
    a frame movably mounted on the upright so that it can be moved toward or away from the base and extending, when in its lower position, along each side of and just above the helmet shell when the shell is seated in the recess in the base;
    a pair of slip sheets of smooth, flexible material so located and of a size to cover the interior side walls of the helmet shell for easing the insertion of the rigid liner; and
    means for fastening the slip sheets to the frame so that they are held to the frame during the insertion of the liner and also during withdrawal of the slip sheets from between the liner and the shell after the assembly has been made.

2. A device for inserting a rigid liner in a helmet shell as described in claim 1 in which the frame is pivotally mounted on the upright.

3. A device for inserting a rigid liner in a helmet shell as described in claim 1, further comprising:
    a latch attached to the upright at a location that will engage the frame when it is raised to its upper position, along with the assembled helmet, to facilitate separation of the assembled helmet from the slip sheets.

4. A device for inserting a rigid liner in a helmet shell as described in claim 1, further comprising:
    a third slip sheet so located and of a size to cover the interior rear wall of the helmet shell; and
    means for fastening the third slip sheet to the frame.

5. A device for inserting a rigid liner in a helmet shell as described in claim 4, further comprising:
    a fourth slip sheet so located and of a size to cover the interior front wall of the helmet shell; and
    means for fastening the fourth slip sheet to the frame.

6. A method of inserting a rigid liner in a helmet shell comprising:
    placing the inverted helmet shell in a bowl-shaped recess;
    lowering a frame toward the helmet shell to the frame's lower position just above and adjacent to the front and sides of the helmet shell;
    fastening smooth, flexible slip sheets to hang from the underside of the frame and extend downward to shroud the interior walls of the helmet shell;
    inserting the rigid liner by shoving it down into the helmet shell eased by the slip sheets;
    adjusting the rigid liner to its proper position in the helmet shell;
    raising the frame to its upper position where the assembled helmet is clear of the recess;
    latching the frame in the upper position; and
    pulling the assembled helmet from the frame leaving the slip sheets fastened to the frame where they are ready for reuse without repeating the fastening step.

* * * * *